United States Patent [19]
Fischer

[11] 3,955,308
[45] May 11, 1976

[54] TOY ERECTING KIT

[76] Inventor: Artur Fischer, Altheimer Strasse 219 D-7241, Tumlingen, Germany

[22] Filed: Oct. 9, 1973

[21] Appl. No.: 404,602

[30] Foreign Application Priority Data

| Oct. 28, 1972 | Germany | 2253081 |
| Dec. 5, 1972 | Germany | 2255600 |
| Dec. 5, 1972 | Germany | 2259385 |

[52] U.S. Cl. .................. 46/16; 46/31; 85/10 R
[51] Int. Cl.² .................. A63H 33/00
[58] Field of Search .......... 46/16, 23, 30, 31; 85/10 R, 14, 28

[56] References Cited
UNITED STATES PATENTS

| 197,513 | 11/1877 | Gross | 85/10 R |
| 1,149,141 | 8/1915 | Hook | 46/16 X |
| 3,389,439 | 6/1968 | Papazian | 85/10 |

FOREIGN PATENTS OR APPLICATIONS

| 659,564 | 3/1963 | Canada | 46/16 |

Primary Examiner—Louis G. Mancene
Assistant Examiner—Robert F. Cutting
Attorney, Agent, or Firm—Michael J. Striker

[57] ABSTRACT

A base plate of a toy erecting kit is of rigid synthetic plastic foam. Connecting elements are provided for releasably mounting on this base plate various auxiliary components of the kit. The connecting elements each have a first portion which can be anchored on the base plate, and a second portion which is provided on the first portion and which can be releasably engaged with one of the auxiliary components.

5 Claims, 9 Drawing Figures

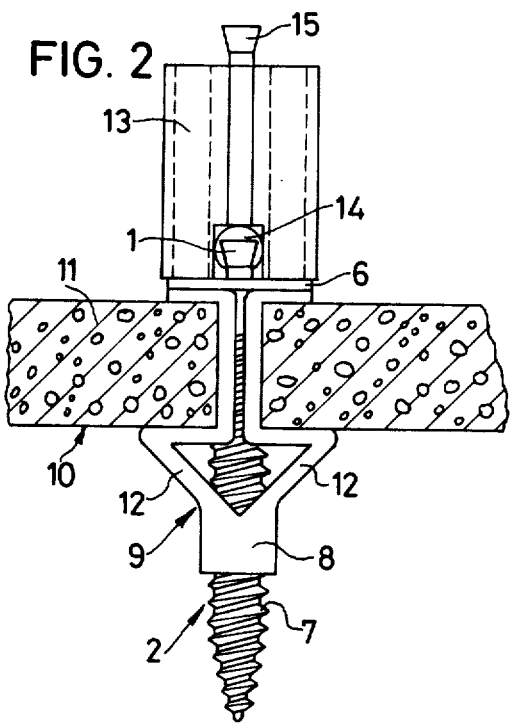
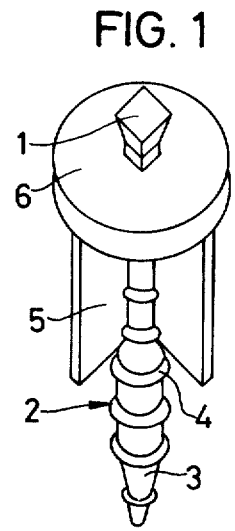
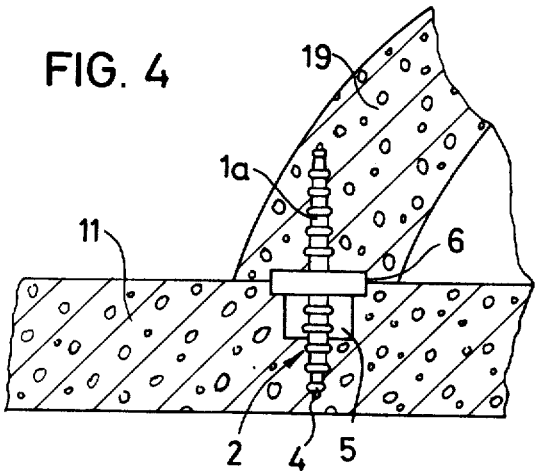
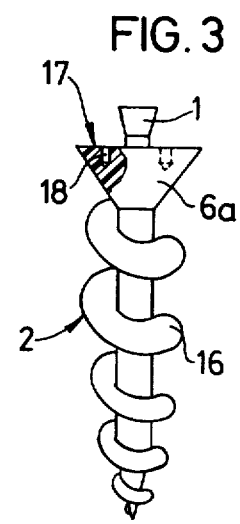

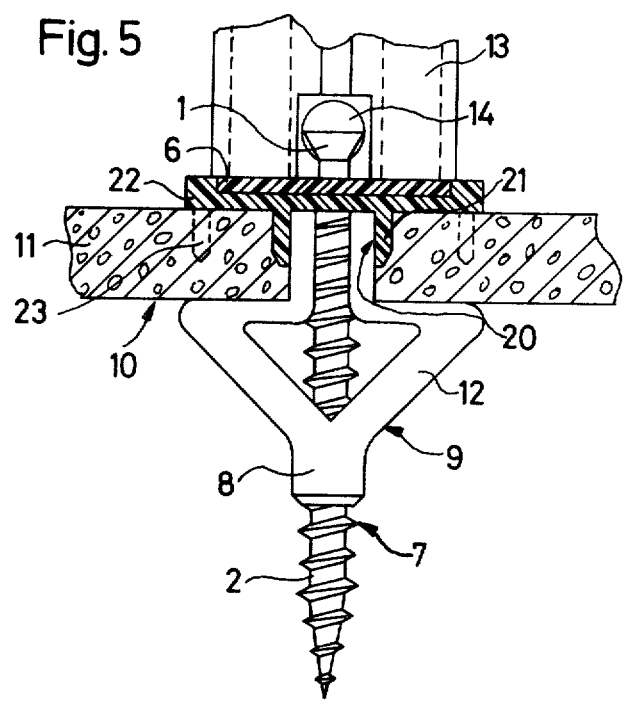
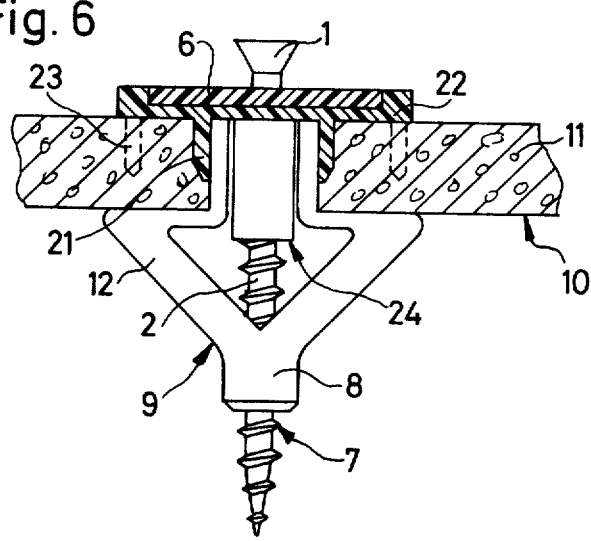

3,955,308

TOY ERECTING KIT

BACKGROUND OF THE INVENTION

The present invention relates generally to a toy, and more particularly to a toy erecting kit. Still more particularly, the invention relates to a toy erecting kit of the type wherein components of the kit are to be releasably mounted on a base plate.

In many instances it is known to mount components of a toy erecting kit on a base plate, for instance on a base plate which simulates a landscape. For example, this is know from model railroad installations, model race tracks and the like which, to increase the interest and realism for the playing child, are adhesively secured to a base plate which may be contoured, painted and the like to simulate an actual landscape. If the installation is of a type which remains in place, for instance a toy railroad track, its mounting in this known-releasable manner on the landscape base plate is not objectionable. However, if it is desired to have such an arrangement mounted on the base plate only temporarily, as is the case with toy erecting kits, this is not a practical approach.

The central concept of toy erecting kits is that they are composed of a plurality of components which can be assembled to form many different kinds of models. This requires that a model, once assembled, can be readily disassembled again so that the components can be used to assemble a different model. If they were to be adhesively secured to the landscape-simulating base plate, as is known from the prior art, the installation would become permanent and would defeat the purpose of the erecting kit, making both the components of the installation and the base plate unuseable for other purposes.

SUMMARY OF THE INVENTION

Accordingly, it is an object of the present invention to overcome this aforementioned disadvantage.

More particularly, it is an object of the present invention to provide an improved toy erecting kit wherein the components of the kit can be so connected with a landscape-simulating base plate that they can be readily removed from the same, thus making both components and the base plate available for other, different applications.

Still more particularly, it is an object of the present invention to provide such an improved toy erecting kit wherein the base plate to which the components of the kit can be releasably connected, is of rigid synthetic plastic foam material. Such material is light in weight and inexpensive to produce, but presents special problems in terms of releasably connecting kit components to it, which problems are overcome by the present invention.

In keeping with the above objects, and with others which will become apparent hereafter, one feature of the invention resides in a toy erecting kit of the type wherein components of the kit are to be releasably mounted on a base plate, particularly a base plate simulating a landscape. The kit comprises a combination of a base plate of rigid synthetic plastic foam, and connecting means for releasably connecting the components to the plate. According to the invention, the connecting means comprises at least one connecting element having a first portion anchorable on the base plate, and a second portion which is provided on the first portion and which is releasably engageable with a component to be mounted on the base plate.

The connecting element, or elements since any desired number may be provided, can be connected with the base plate of rigid synthetic plastic foam at any desired location, and thus can serve to anchor other components of the kit to the base plate. Since the components can be releasably connected with the element or elements, a model erected on the base plate can subsequently be detached and another model can be erected on the plate. Moreover, the model need clearly not be installed in the same place in which the previous model was located, but can be positioned at a different location of the base plate simply by moving the previously anchored connecting element to this different location, or by connecting an additional connecting element with the base plate at this location.

According to the present invention, the connecting element is such that it can be readily produced, as will become evident hereafter. The connecting element can be of such construction that it can be produced of one piece in an injection molding operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view of one type of connecting element according to the invention;

FIG. 2 is a fragmentary vertical sectional view, illustrating a base plate with a second type of connecting element secured thereon;

FIG. 3 is a partly sectioned perspective view, illustrating a further type of connecting element;

FIG. 4 is a view analogous to FIG. 2, illustrating an additional type of connecting element;

FIG. 5 is a view analogous to FIG. 2, illustrating a further type of connecting element;

FIG. 6 is a view to similar to FIG. 5, showing yet an additional embodiment of a connecting element;

DESCRIPTION OF THE PREFERRED EMBODIMENTS

Figure 7:
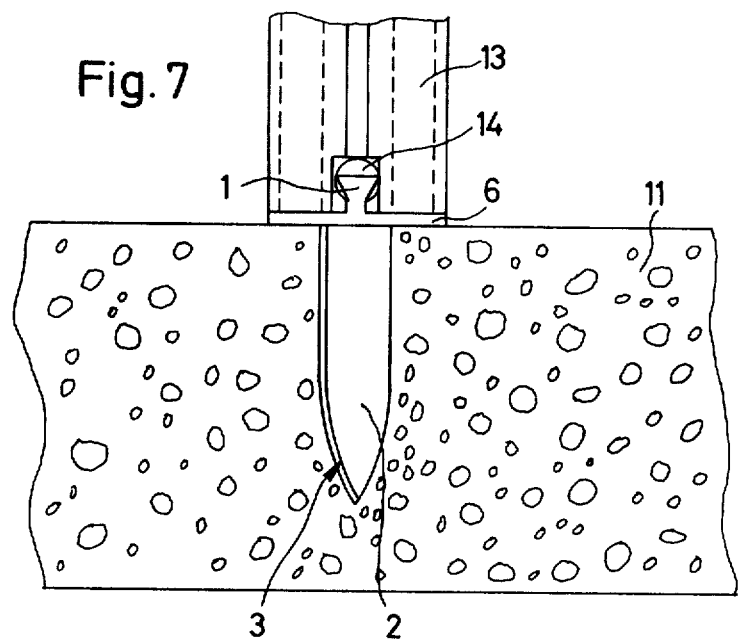
FIG. 7 is a view similar to FIG. 6, illustrating still another embodiment of a connecting element.

Discussing the drawings now in detail, and referring firstly to FIG. 1, it will be seen that this illustrates a connecting element according to the present invention. This connecting element comprises a portion 2 which is to be anchored in the rigid synthetic plastic foam base plate 11 (the latter is shown in FIG. 2), and a portion 1 which can be releasably connected with an auxiliary component of a toy erecting kit. In the illustrated embodiment, the portion 1 is configurated as an undercut coupling head of quadratic cross section, although it could, of course, have a different outline (for instance a circular outline) or it could be of a different type, for instance it could be an undercut groove. In any case, the portion 2 is provided with a tip 3 to facilitate its insertion into the material of the base plate 11. This portion 22 is intended to be pushed into the material of the base plate 11 and to improve its holding capability once it has been so installed, the portion 2 is provided with a plurality of axially spaced annular ribs 4 which surround it. The portions 1 and 2 have interposed between them a cylindrical abutment 6 which is to abut against that side of the base plate 11 from which the portion 2 is driven into the latter. Extending downwardly from the abutment 6, axially of the portion 2, are fins 5 (one or more). When the portion 2 is pressed into the material of the plate 11, it will first penetrate until the lower edges of the fins 5 are reached; further pressure on the connecting element in FIG. 1 will then cause the fins 5 also to penetrate into the material of the plate 11, whereby the connecting element will be not only anchored in the plate 11, but will be prevented from turning relative to the plate 11 by the presence of the fins 5.

FIG. 2 shows a further embodiment of the invention, wherein the plate 11 is shown fragmentarily. The plate 11 is, of course, of synthetic plastic foam material of a rigid type, for instance the type known as styrofoam. The connecting element provided in this embodiment has again the portion 2 which, however, is provided with external screw threads 7 resembling those of a wood screw. There is further provided a sleeve 9 which is of the expansible type and has an internally threaded tubular portion 8 at one end. From this portion 8 there extend webs 12 which are elongated and preferably are of arcuate cross section. The portion 7 can be pushed or screwed through the material of the plate 11, or a hole can otherwise be made in the same. Thereupon, the sleeve 9 is pushed through this hole (if the hole has been made by the portion 2 the latter must first be withdrawn), and now the portion 2 is threaded into the sleeve until its threads 7 engage the internal threads of the portion 8. Further turning of the portion 2, for which purpose the portion 1 can be engaged and turned, causes the tubular portion 8 to be pulled towards the plate 11. This results in radial buckling of the initially straight webs 12 until they assume the position shown in FIG. 2 in which they abut the side 10 of the plate 11 and anchor the connecting element in the plate. When this is done, the portion 1 which is again configurated as a coupling head corresponding to the one shown in FIG. 1, can have releasably connected to its various components of the erecting kit, for instance a structural element 13 which is provided with one or more undercut grooves 14 in which the portion 1 can be releasably received by inserting it through an open end of the groove 14, and which may also be provided with one or more of its own undercut coupling heads 15 so that additional ones of the structural elements 13 can be connected to the one that has been mounted on the plate 11.

FIG. 3 shows only a connecting element, the plate 11 having been omitted as not necessary for an understanding of this embodiment. The connecting element shown in FIG. 3 can have the portion 2 which in this embodiment is provided with large-surface baffles 16 surrounding the central pin portion of the portion 2 and forming a plurality of screw flights of a steep pitch. In other words, the portion 2 is essentially constructed as a screw anchor of the type which is for instance known for threading into the ground. The large dimensions of the rather broad vanes forming the screw flights assure that the portion 2 can be anchored in the material of the plate 11 and in a very reliable manner. This eliminates the need in this embodiment for providing a sleeve corresponding to the one shown in the embodiment of FIG. 2.

In this embodiment, the abutment portion 6 of FIG. 1 is replaced with a frustoconically tapered abutment portion 6a the larger end face of which has the portion 1 projecting from it. This larger end face is identified with reference numeral 17 and due to the frustoconical configuration of the portion 6a, the latter can be made to be countersunk in the material of the plate 11 until the end face 17 is flush with the upper side of the plate 11. To facilitate turning of the connecting element of FIG. 3, the end face 17 may be provided with recesses 18 which may, for instance, be offset by 90° about the portion 1, and into which a tool can be inserted which facilitates the turning of the connecting element in FIG. 3.

The embodiment in FIG. 4 again shows the base plate 11 in fragmentary form. In this embodiment, the connecting element has a portion 1 resembling the corresponding portion in the connecting element of FIG. 1. The portion 1 of the embodiment in FIG. 1, however, has been replaced in the embodiment of FIG. 4 with a portion 1a which corresponds in configuration to the portion 2. Thus, the connecting element of FIG. 4 is essentially symmetrical at the opposite sides of the abutment portion 6.

This embodiment is particularly suitable for connecting to the plate 11 a contoured element 19, which is also of rigid synthetic plastic foam material and may, for instance, simulate a mountain, a boulder or the like. The vanes 5 correspond to those shown in FIG. 1 and the connection between the portions 1a and 2 and the elements 19 and 11, respectively, is effected by pushing the portions 1a and 2 into these respective elements. This embodiment of the connecting element as well as that of FIG. 1, has the advantage that the respective portions 2 or 1a can be readily pushed into the material of the rigid plastic foam components (11 or 19), whereas the retentive capability afforded by the ribs 4 is in most instances sufficient to properly anchor the connecting element.

In the embodiment of FIG. 5, the plate 11 is again shown fragmentarily and in section. The connecting element has a portion 1 corresponding to the preceding portions 1 and shown in the illustrated embodiment as being received in an undercut groove 14 of a component 13 which is to be secured releasably to the plate 11.

The connecting element in FIG. 5 also has again the portion 2 which is provided with screw threads 7 mentioned in connection with the embodiment in FIG. 2. In FIG. 5, also, there is again provided a sleeve 9 having the portion 8 and the webs 12, in keeping with the illustration of the embodiment in FIG. 2.

However, in this embodiment a possible movement of the free ends of the webs 12 in direction radially away from one another in the region of the end 20 of the hole extending through the plate 11, at such time as the portion 8 is drawn towards the side 10 of the plate 11 by turning of the portion 2, a retaining component is provided having a tubular portion 21 which surrounds the free ends of the webs 12 by being pushed into the material of the plate 11. This same component is further provided with a wide flange 22 against which the portion 6 abuts which is of one piece with the portions 1 and 2. Pins, projections or the like 23 are provided on the flange 22, and are pressed into the material of the plate 11 to prevent turning of the flange and the tubular portion 21.

This embodiment is particularly advantageous if the material of the plate 11 is brittle, porous and/or will readily yield to pressure, since it prevents the undesired moving-apart of the free ends of the webs 12. Of course, the material of the component 21, 22 must have sufficient strength for this purpose. In this embodiment, as in the embodiments of FIGS. 2 and 6, the outward buckling of the webs 12 will always take place outside of the hole which extends through the plate 11. This can be predetermined by providing the webs 12 with weakened portions (kerfs of the like) where subsequent buckling is to occur. Alternately, the axial length of the sleeve 9 can be so selected as to predetermine where the buckling of the webs 12 is to occur, i.e., at which point along their respective lengths. The engagement of the underside 10 of the buckled webs 12 assures for a very reliable retention of the connecting element.

The threading-in of the connecting element portions 1 and 2 into the sleeve 9 can be accomplished in various ways, a simple one of which is to insert the portion 1 into the groove 14 of a component 13, and thereupon use the component 13 to turn the portions 1 and 2 and to thread them into the portion 8 of the sleeve 9 until the webs 12 buckle and the sleeve is anchored in the plate 11.

The embodiment of FIG. 6 is reminiscent of that in FIG. 5, and like components identify like elements. Here, however, the portion 2 is additionally provided with a projection or abutment 24 whose length axially of the portion 2 in the direction from the portion 1 is so selected that it will be abutted by the portion 8 (or by those parts of the webs 12 which are immediately adjacent the portion 8) at such times as maximum spreading-apart of the webs 12—and thus optimum anchoring of the sleeve 9 in the plate 11—has occurred. At this time, of course, there will be no further displacement of the portion 8 towards the underside 10 of the plate 11, due to the engagement between the abutments 24 and the portion 8 or the portions of the webs 12 which are immediately adjacent the portion 8.

The embodiment in FIGS. 7 and 8 again uses like reference numerals for like components as in the preceding Figures. Here, however, the portion 2 is configurated as a knife-edge blade having a pointed free end 3. It can, of course, be particularly readily pushed into the material of the plate 11. It is advantageous if the general plane of the portion 2 in this embodiment is offset through substantially 45° with respect to the direction in which the portion 1 and a component 13 must be moved relative to one another to insert the portion 1 into the groove 14 of the component 13. This is shown particularly clearly in the top-plan view of FIG. 8 wherein only the connecting element has been shown. The abutment portion 6 is located between and of one piece with the portions 1 and 2 and limits the extend to which the element can be pushed into the plate 11. At the same time, it also serves to support a component (such as the component 13) which is to be connected with the portion 1.

Figure 8:
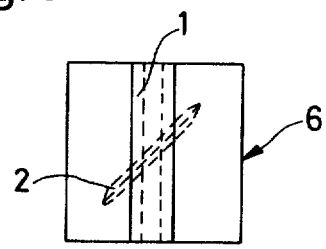
FIG. 8 is a top-plan view of the connecting element in FIG. 7.

Evidently, the small thickness of the portion 2 in FIGS. 7 and 8, that is the small dimension between the major surfaces of the portion 2, permits a ready insertion of the portion 2 into the relatively soft and porous material of the plate 11. In this embodiment, in particular, the edges of the portion 2 slice through the material of the plate 11, avoiding crumbling of the foam material of the plate which would take place if a blunt component were to be pushed into the material. This crumbling is highly undesirable, because it severely reduces, or even destroys the retentive capability of the material of the plate 11. In contradistinction to this, the insertion of the portion 2 in FIGS. 7 and 8 results in a slicing of the portion 2 through the material of the plate 11, but since no crumbling of the material is involved, its retentive capability is fully retained. Thus, the portion 2 in the embodiment of FIGS. 7 and 8, which is engaged with a certain amount of elastic pressure by the surrounding material of the plate 11, is retained rather well in the plate against undesired withdrawal.

On the other hand, the displacement of the general plane of the portion 2 with reference to the direction in which the portion 1 and the component 13 must be moved to effect their connection (in FIG. 7 this direction is normal to the plane of the drawing) assures that in this direction, in which the stresses acting upon the portion 2 are the greatest, it is the major surfaces of the portion 2 which engage the material of the blade 11. This not only serves the purpose of preventing undesired tilting of the portion 2 within the material of the plate 11, and thus destruction of the material and loosening of the portion 2, but also prevents later tilting when forces are transmitted to the portion 2 from a model which has been erected on the plate 11 and is anchored to the same by the embodiment of FIGS. 7 and 8.

Figure 9:
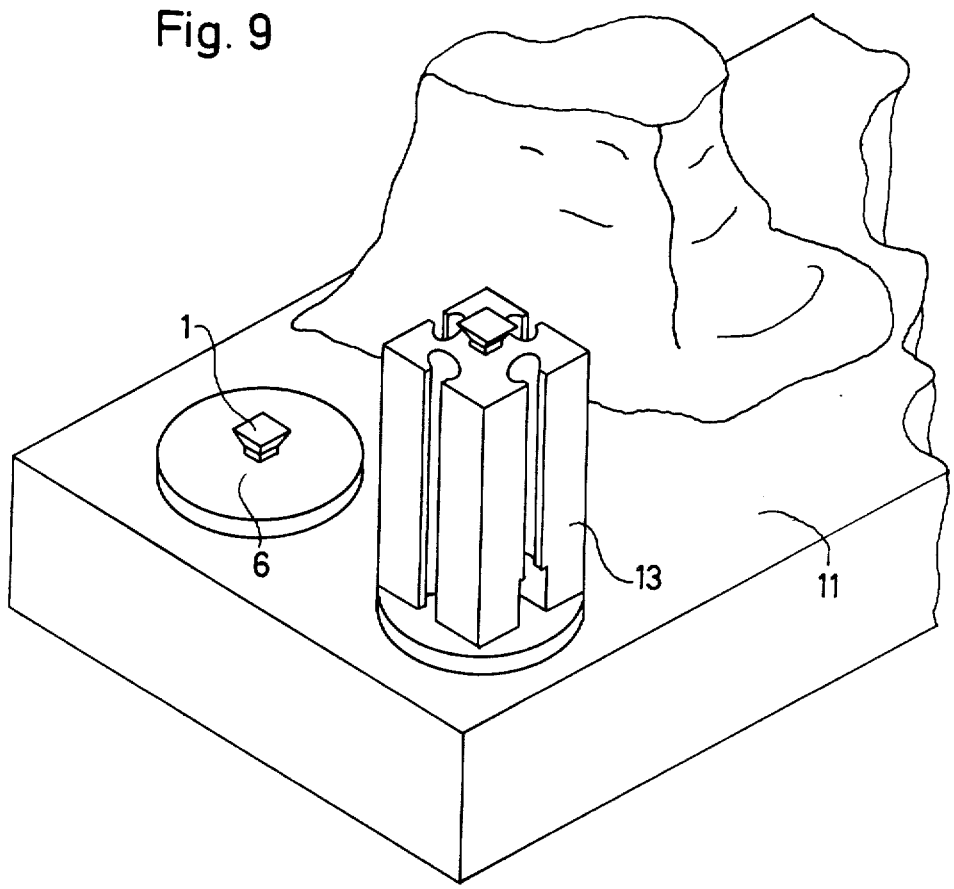
FIG. 9 is a perspective view of a landscape-simulating base plate according to the invention, with one of the connecting elements anchored in it.

In FIG. 9 I have illustrated merely for general orientation a top-plan view of a plate 11, showing surface contouring which is to resemble a landscape and illustrating the connecting element of FIG. 1 in its installed condition.

It should still be pointed out that particularly with the embodiment of FIG. 4 it is very readily possible to connect additional foamed plastic material components, such as rocks, mountains or the like, to the plate 11. Of course, such components need not necessarily be of foamed plastic material, but in any case the connecting element in FIG. 4 affords the playing child a ready opportunity to use a flat or only slightly contoured base plate and to install various contour-imparting components on it to the taste of the child. Moreover, these contours can later be changed by removing or shifting the contour-imparting components on the plate. If the plate is of slightly box-shaped configuration, that is if it has side walls which extend to one side so that the effect of a shallow box having an open side is created, then the plate can be used to simulate a landscape if the open side faces downwardly, or for instance to simulate a harbor or a seascape if the plate is turned so that the open side faces upwardly. This further improves the versatility of the invention.

By means of the portions 1 or 1a, substantially plate-shaped components which themselves are provided with one or more connecting elements (e.g., undercut grooves 14 and projecting coupling heads 15) are connectable to the plate 11, so that via these plates a large number of auxiliary components, for instance the same as the components 13, can be connected to the plate 11.

It will be understood that each of the elements described above, or two or more together, may also find a useful application in other types of constructions differing from the type described above.

While the invention has been illustrated and described as embodied in an erecting kit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In a toy erecting kit of the type wherein components of the kit are to be releasably mounted on a base plate, particularly a base plate simulating a landscape, a combination comprising a base of rigid synthetic plastic foam; and connecting means, comprising at least one connecting element having a first portion anchorable in said base plate and configurated as a double-edged knife blade, a second portion provided on said first portion and releasably engageable with a component to be mounted on said base plate, and an abutment located intermediate said first and second portions and arranged to abut said base plate when said first portion is anchored in the same.

2. A combination as defined in claim 1, wherein said synthetic plastic material is styrofoam.

3. A combination as defined in claim 1, wherein said second portion is an undercut coupling head which is receivable in cooperating undercut grooves of respective ones of said components.

4. A combination as defined in claim 1, wherein said second portion is engageable with a component to be mounted by effecting relative movement of said second portion and component in one direction; and wherein said first portion has a general plane which extends at an angle of substantially 45° with reference to said direction.

5. A combination as defined in claim 1, wherein said first portion is provided with a pointed tip for facilitating its penetration into said base plate.

* * * * *